Aug. 13, 1935.  W. E. RICHARD  2,010,896
SYSTEM OF LUBRICATION
Filed March 21, 1928
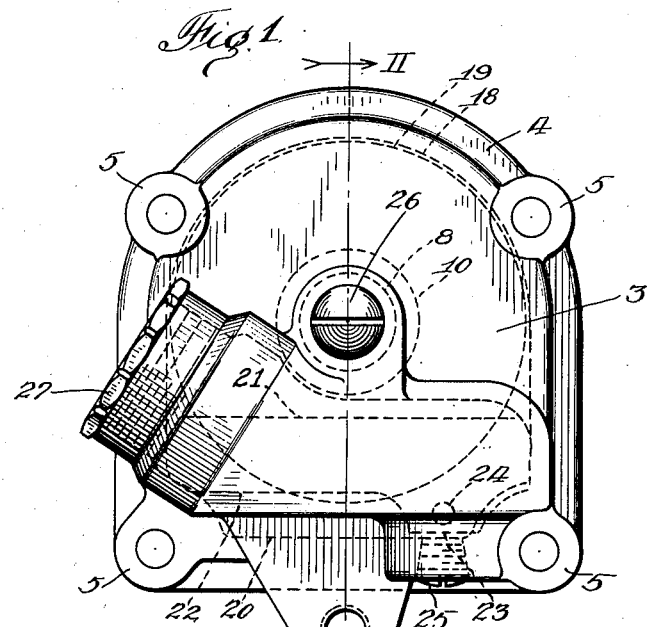
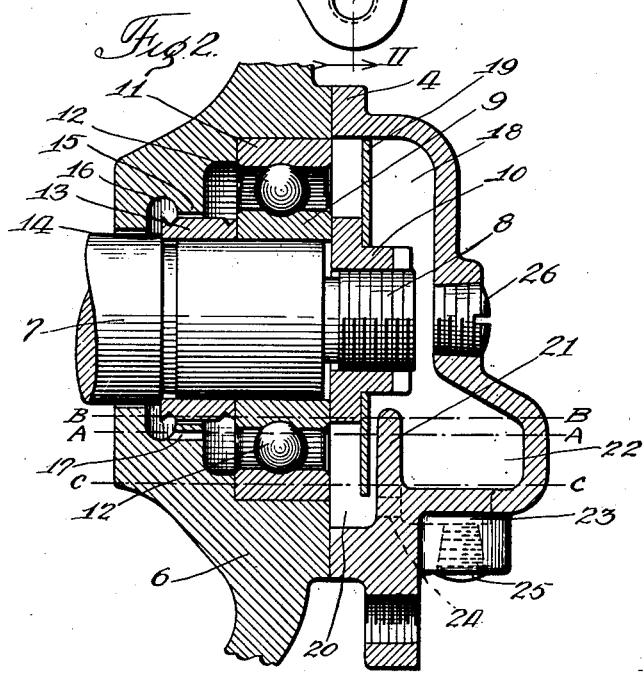
Inventor:
William Edward Richard
By Jones, Addington, Ames & Seibold
Attys.

Patented Aug. 13, 1935

2,010,896

UNITED STATES PATENT OFFICE 2,010,896

SYSTEM OF LUBRICATION

William Edward Richard, Evansville, Ind., assignor to Sunbeam Electric Manufacturing Company, Evansville, Ind., a corporation of Indiana Application March 21, 1928, Serial No. 263,294

10 Claims. (Cl. 308—126)

My invention relates to systems of lubrication and has particular relation to means for lubricating bearings of machines having parts that are adapted to rotate at relatively high speeds.

The particular embodiment of my invention shown and described herein has been developed particularly for use in connection with a turbine-driven generator for supplying electric current for headlights and other accessories of railway locomotives, but it will be understood that the invention is in no wise limited to this particular embodiment.

In the past, it has been considered necessary to provide a relatively small quantity of oil for lubricating relatively high speed bearings, which bearings are usually of the antifriction type. The use of a comparatively large supply of lubricant results in churning and foaming of the same, causing shorter life and greater leakage of the oil, and also in increasing the operating temperature of the bearing by reason of the increased friction within the oil itself.

The use of an oil sump below the bearing is another method permitting the provision of a relatively large supply of oil, but this method has the disadvantage of requiring means for raising the oil to the level of the bearing. This is frequently accomplished by means of rotating dippers, oil rings, or chains, but none of these devices are well adapted for use with high speed apparatus.

The only alternative, therefore, has been to utilize a relatively small supply of lubricant in connection with bearings of the type referred to. The objection to this method of lubrication, obviously, lies in the necessity for replenishing the supply of oil at frequent intervals.

The present invention contemplates the provision of such lubricating means that a relatively large reservoir or supply of lubricant may be disposed in direct connection with the bearing, without incurring any of the disadvantages usually resulting from such arrangement.

My invention will be better understood by reference to the following detailed description, in conjunction with the accompanying drawing, in which:

Figure 1 is an end elevational view of a closure and reservoir member for a bearing of the type referred to; and Fig. 2 is a vertical sectional view taken along the line II—II of Fig. 1, also showing, along the same section, the cooperating parts of a machine with which the closure and reservoir member is adapted to cooperate.

Referring to the drawing, a closure and reservoir member 3 comprises a peripheral flange portion 4 having lugs or ears 5 with holes therein through which bolts or cap screws are adapted to extend to secure the closure member to a portion 6 of a machine frame or other member. A rotatable shaft 7 of the machine is provided with a screw-threaded reduced-diameter portion 8 extending outwardly from the frame portion 6 beyond the plane at which the closure member 4 joins the frame portion 6.

An inner race member 9 of an antifriction bearing is secured to the shaft 7 by a nut 10 cooperating with the screw-threaded extending portion 8 of the shaft. This bearing has an outer race member 11 that is suitably supported in the frame portion 6 of the machine. Antifriction members, such as balls 12, are disposed between the two race members 9 and 11.

The inner race member 9 is provided with an integral sleeve portion 13 which extends inwardly along the shaft 7 and abuts against a shoulder portion 14 of said shaft to retain said race member in its proper position longitudinally of the shaft. An inwardly extending flange portion 15 of the frame portion 6 extends into relatively close relation to the sleeve portion 13 for the purpose of providing a relatively leakage-proof connection between the bearing chamber and the interior of the machine.

Any lubricant that leaks or creeps past this connection, however, is thrown off by centrifugal force from the inner extremity of the sleeve portion 13 into a substantially toroidal cavity or chamber 16, the bottom of which is connected by a passage 17 with the main bearing chamber. Lubricant which is thrown off in this manner in the chamber 16 is thus allowed to drain back into the main bearing chamber through the passage 17.

The closure and reservoir member 3 extends outwardly from the flange portion 4 to provide a chamber 18 within which the outer extremity of the shaft 7 and the nut 10 are permitted to rotate. A disc member 19 is suitably secured to the nut 10 to rotate therewith and is also located within the chamber 18 of the closure member 3 when the mechanism is assembled.

The lower interior portion of the closure and reservoir member 3 constitutes a lubricant reservoir or chamber 20, the outer side of which is bounded by an upwardly extending partition 21 that is an integral portion of the member 3, and the inner side of which is bounded by the frame portion 6. A second chamber 22 is provided in the member 3 between the partition 21 and the outer wall of the said member. This chamber extends substantially across the entire width of the member 3, and the bottom surface thereof is substantially higher than the bottom of the chamber 20, with the exception of a relatively small depressed portion 23 near one end of said chamber. An opening 24 is provided in the partition 21 and serves to connect the chamber 20 and the depressed portion 23 of the chamber 22.

A screw-threaded drain-plug 25 is provided in the bottom of the depressed portion 23 of the chamber 22 for the purpose of permitting oil or other lubricant to be drained therefor, when desired. Another screw-threaded plug 26 is provided substantially at the center of the closure member 3 and in alignment with the shaft 7 for the purpose of permitting an inspection of the end of the shaft or the insertion of a tachometer or other instrument.

A screw-threaded filler plug 27 is provided in an upwardly and outwardly extending portion of the member 3 and communicates with the interior of the said member to permit supply of lubricant thereto. The lower edge of the opening in which the filler plug 27 is disposed may be located at such level as to determine the maximum amount of lubricant which may be inserted in the apparatus.

It will be observed that the rotatable disc 19 extends into relatively close relation to the upper surface of the chamber 18, and that said disc extends downwardly an appreciable distance into the chamber or reservoir 20. During the normal operation of the device, the disc 19 dips into the oil in the chamber 20 and splashes and whirls the same around throughout the interior of the mechanism. An ample portion of the oil thus distributed by the disc 19 finds its way into the race-ways of the bearing race members 9 and 11 and provides suitable lubrication for the bearing under all conditions.

A considerable quantity of the oil distributed by the disc 19, however, is thrown onto the inner surface of the closure member 3 and drains downwardly on said surface into the reservoir or chamber 22. When the device has been in operation a short time, therefore, the major portion of the lubricant will have been transferred to the chamber 22 by the action of the disc 19.

The amount of lubricant which may be contained by the chamber 22 is limited by the height of the partition 21, so that, if too much lubricant is transferred to this chamber, it will overflow said partition back into the chamber 20. Normally, however, the lubricant in the chamber 22 will drain back relatively slowly through the opening 24 into the chamber 20. The size and height of the opening 24 may be varied to determine the rate at which the lubricant flows therethrough to obtain the ideal operating conditions.

In the operation of my device, it will be seen that the lubricant reservoirs may be initially filled to a level such as that indicated by the line A—A of Fig. 2, which may be any level up to that of the lower edge of the filler plug opening through which the lubricant is inserted. The amount of lubricant contained up to this level is amply sufficient to provide proper lubrication for the bearing for a long period of time.

When the mechanism is at rest, however, this quantity of lubricant would submerse a considerable portion of the lower part of the bearing members and of the disc 19. This condition, if allowed to continue, would result in the numerous disadvantages usually incident to the provision of a large amount of lubricant in connection with the bearing, as heretofore referred to.

As soon as the mechanism is placed in operation, however, the major portion of this lubricant will be transferred to the chamber 22 by the above-described action of the disc 19, thereby raising the lubricant in said chamber to a level such as that indicated by the line B—B in Fig. 2, and lowering the lubricant in the chamber 20 to a level such as that indicated by the line C—C.

The lubricant thus transferred to the chamber 22 is permitted normally to drain back through the opening 24, or, in the event of too great a transfer, over the top of the partition 21, to maintain just enough lubricant in the chamber 20 to effect proper lubrication in the bearing. Under these conditions, none of the rotating parts of the mechanism is submersed in the lubricant supply, and the disc 19 dips into such supply in the chamber 20 only far enough to lift the requisite amount of lubricant therefrom.

The amount of lubricant in the chamber 20 is automatically maintained at the proper level, since an excessive reduction thereof will decrease the amount of lubricant picked up by the disc 19 to such a point that the return flow through the opening 24 will exceed the amount thus picked up. Under this condition, the level of lubricant in the chamber 20 will be raised, since the lubricant is flowing into said chamber at a greater rate than that at which it is being removed.

From the foregoing description, it will be seen that I have provided means whereby a large quantity of lubricant may be disposed in connection with a bearing without incurring any of the disadvantages usually incident to such arrangement. Only a relatively small amount of lubricant is in direct communication with the bearing, except when the same is stationary and for a very short interval after the initiation of operation thereof.

While I have described only one particular embodiment of my invention, it will be apparent to those skilled in the art that various changes and modifications may be made in the details of construction thereof without departing from the spirit and scope of my invention, as set forth in the appended claims.

I claim:

1. A bearing lubricating device comprising a housing for the bearing having a partition therein forming two chambers adapted to contain fluid lubricant, one of said chambers being in direct communication with the bearing and normally having lubricant standing therein at a level above the bottom of the rotatable parts of the bearing when the latter is not in operation, and means operated concurrently with the bearing for transferring lubricant from said one of said chambers to the other of said chambers to reduce the lubricant level in the former below the bottom of the rotating parts of the bearing.

2. A bearing lubricating device comprising a housing for the bearing having a partition therein forming two chambers adapted to contain fluid lubricant, one of said chambers being in direct communication with the bearing and normally having lubricant standing therein at a level above the bottom of the rotatable parts of the bearing when the latter is not in operation, and means comprising a rotatable disc operated concurrently with the bearing for transferring lubricant from said one of said chambers to the other of said chambers to reduce the lubricant level in the former below the bottom of the rotating parts of the bearing.

3. A bearing lubricating device comprising means forming two chambers adapted to contain fluid lubricant, one of said chambers being in direct communication with the bearing and normally having lubricant standing therein at a level above the bottom of the rotatable parts of the bearing when the latter is not in operation, and means operated concurrently with the bearing for transferring lubricant from said one of said chambers to the other of said chambers to reduce the lubricant level in the former below the bottom of the rotating parts of the bearing.

4. A bearing lubricating device comprising means forming two chambers adapted to contain fluid lubricant, one of said chambers being in direct communication with the bearing and normally having lubricant standing therein at a level above the bottom of the rotatable parts of the bearing when the latter is not in operation, and means comprising a rotatable disc operated concurrently with the bearing for transferring lubricant from said one of said chambers to the other of said chambers to reduce the lubricant level in the former below the bottom of the rotating parts of the bearing.

5. A bearing lubricating device comprising means forming two chambers adapted to contain fluid lubricant, one of said chambers being in direct communication with the bearing and normally having lubricant standing therein at a level above the bottom of the rotatable parts of the bearing when the latter is not in operation, and means operated concurrently with the bearing for transferring lubricant from said one of said chambers to the other of said chambers to reduce the lubricant level in the former below the bottom of the rotating parts of the bearing, said chambers being connected by a passageway through which lubricant is permitted to flow back into said one of said chambers.

6. A bearing lubricating device comprising means forming two chambers adapted to contain fluid lubricant, one of said chambers being in direct communication with the bearing and normally having lubricant standing therein at a level above the bottom of the rotatable parts of the bearing when the latter is not in operation, and means comprising a rotatable disc operated concurrently with the bearing for transferring lubricant from said one of said chambers to the other of said chambers to reduce the lubricant level in the former below the bottom of the rotating parts of the bearing, said chambers being connected by a passageway through which lubricant is permitted to flow back into said one of said chambers.

7. A bearing lubricating device comprising a housing for the bearing having a partition therein forming two chambers adapted to contain fluid lubricant, one of said chambers being in direct communication with the bearing and normally having lubricant standing therein at a level above the bottom of the rotatable parts of the bearing when the latter is not in operation, and means operated concurrently with the bearing for transferring lubricant from said one of said chambers to the other of said chambers to reduce the lubricant level in the former below the bottom of the rotating parts of the bearing, said partition having a passageway therethrough through which lubricant is permitted to flow back into said one of said chambers.

8. A bearing lubricating device comprising a housing for the bearing having a partition therein forming two chambers adapted to contain fluid lubricant, one of said chambers being in direct communication with the bearing and normally having lubricant standing therein at a level above the bottom of the rotatable parts of the bearing when the latter is not in operation, and means comprising a rotatatble disc operated concurrently with the bearing for transferring lubricant from said one of said chambers to the other of said chambers to reduce the lubricant level in the former below the bottom of the rotating parts of the bearing, said partition having a passageway therethrough through which lubricant is permitted to flow back into said one of said chambers.

9. The method of lubricating a bearing which consists in providing a relatively large supply of lubricant in connection therewith sufficient to immerse part of the bearing, removing a sufficient portion of said supply from direct communication with the bearing during the operation thereof to lower the level of said supply below the rotating parts of the bearing, permitting the lubricant thus removed to return relatively slowly to its original position, and continuously removing the lubricant from such position to maintain the lowered level thereof, while bringing only a portion of the lubricant so removed into contact with the bearing.

10. The method of lubricating a bearing which consists in providing a reservoir of lubricant in connection therewith sufficient to immerse part of the bearing and continuously removing and distributing the lubricant from said reservoir during the operation of the bearing in such manner that only a portion of said lubricant comes into contact with the bearing, while the remaining portion thereof drains back into said reservoir at a rate sufficiently slow that the level of lubricant in said reservoir is maintained below the rotating parts of the bearing as long as operation of the latter continues.

WILLIAM EDWARD RICHARD.